(12) United States Patent
Hessling et al.

(10) Patent No.: US 8,060,496 B2
(45) Date of Patent: Nov. 15, 2011

(54) METHOD FOR CREATING APPENDICES THAT CLEARLY REFERENCE THE LOCATION OF AN OBJECT

(75) Inventors: Matthias Hessling, Hildesheim (DE); Andreas Buecher, Osterode (DE); Cornelius Hahlweg, Hildesheim (DE); Heinz-Werner Pfeiffer, Hohenhameln (DE); Henry Brandes, Woelpinghausen (DE)

(73) Assignee: Robert Bosch GmbH, Stuttgart (DE)

( * ) Notice: Subject to any disclaimer, the term of this patent is extended or adjusted under 35 U.S.C. 154(b) by 1244 days.

(21) Appl. No.: 10/415,700

(22) PCT Filed: Sep. 29, 2001

(86) PCT No.: PCT/DE01/03767
§ 371 (c)(1),
(2), (4) Date: Oct. 8, 2003

(87) PCT Pub. No.: WO02/39064
PCT Pub. Date: May 16, 2002

(65) Prior Publication Data
US 2004/0059745 A1 Mar. 25, 2004

(30) Foreign Application Priority Data
Nov. 7, 2000 (DE) .................................. 100 55 195

(51) Int. Cl.
*G06F 17/30* (2006.01)

(52) U.S. Cl. .......................... 707/722; 707/770; 707/920
(58) Field of Classification Search .................. 707/102, 707/4, 722, 769, 770, 919, 920
See application file for complete search history.

(56) References Cited

U.S. PATENT DOCUMENTS

| 5,470,233 | A | * | 11/1995 | Fruchterman et al. ........ 434/112 |
| 5,745,867 | A | | 4/1998 | Mills |
| 5,919,245 | A | * | 7/1999 | Nomura ........................ 701/207 |
| 6,081,803 | A | * | 6/2000 | Ashby et al. .......................... 1/1 |

FOREIGN PATENT DOCUMENTS

| DE | 198 29 801 | 1/2000 |
| DE | 198 60 679 | 7/2000 |
| DE | 100 09 149.0 | 3/2001 |
| DE | 100 38 343.2 | 8/2001 |
| DE | 100 23 309.0 | 11/2001 |
| EP | 1 020 832 | 7/2000 |
| JP | 9-178499 | 7/1997 |
| JP | 9-218097 | 8/1997 |
| WO | WO 99/09374 | 2/1999 |

* cited by examiner

*Primary Examiner* — Angela Lie
(74) *Attorney, Agent, or Firm* — Kenyon & Kenyon LLP

(57) ABSTRACT

To generate appendices which uniquely reference an object geographically, a tree of possible paths is generated. The paths are evaluated in accordance with predefined criteria, which are suited for use as termination criteria, at the time the paths are formed. Of the remaining paths, at least that one is coded as an appendix which best fulfills at least one of the criteria.

13 Claims, 1 Drawing Sheet

METHOD FOR CREATING APPENDICES THAT CLEARLY REFERENCE THE LOCATION OF AN OBJECT

FIELD OF THE INVENTION

The present invention is directed to a method for generating appendices which uniquely reference an object geographically.

BACKGROUND INFORMATION

Various methods are known for transmitting location-specific information, such as traffic messages. For example, in a TMC (traffic message channel), a location is transmitted on the basis of a location code. A geographic position and, thus, also a local allocation of the message are first rendered using a location database in the receiver. For navigational purposes, digital road maps are used, in which the individual objects are characterized by their geographic location and by their street connections. To transmit any location-specific information at all to receivers which contain an appropriate database (receiver database), a coding—also referred to as referencing—is carried out on the basis of a geographic context. This referencing goes beyond the specification of geographic data, since these data are not able to exclude ambiguities. There are, moreover, deviations in the databases, for example due to various manufacturers. Therefore, to describe all these data, referencing appendices are discussed in the following.

German Published Patent Application Nos. 100 38 343.2, 100 09 149.0, and 100 23 309.0 have proposed methods which provide for a reliable referencing in systems having distributed geographic databases. Beyond the original objective of generating references among objects which are, in fact, present in two different databases, but are each described differently, the methods in the aforementioned patent applications enable geographic objects to be navigably incorporated in a database where they originally had not been present. To this end, the object, e.g., a parking garage, is supplemented by appendices, e.g., by the geometry of an access road. On the receiver side, using pattern recognition, an at least partial map matching is achieved, geometric components present on the object side and not in the database being reentered, for example as access roads.

SUMMARY OF THE INVENTION

According to the present invention, appendices are generated which uniquely reference objects geographically. Thus, it is possible to automatically generate extensive POI (places of interest) databases, or even an "on-the-fly referencing".

In contrast to the methods in the aforementioned patent applications, the appendices, which are to be uniquely assigned to an object, do not have to be selected manually, but rather can be selected in accordance with a reliable automatic process which may be carried out, in particular, on the basis of vector maps. When the paths for referencing the objects are generated, criteria are used to evaluate and select a path. These may be termination criteria, in those cases, for example, where the object cannot be approached directly because of the predefined driving direction within the path (one-way street). Besides these criteria, other criteria may also be provided to select that path which best fulfills at least one of the criteria, i.e., is the most probable path.

In accordance with another exemplary embodiment, coordinate chains are used as paths, which lie at least partially on traffic routes, which are contained in a receiver database and include characteristic properties of parts of a traffic route network.

Vector maps may be used as a basis for selecting the paths. Other data material pertaining to geographic objects and travel paths, e.g., printed map material may be prepared in advance in vector maps.

According to a further exemplary embodiment, a few criteria for generating the appendices may be applied individually or in combination.

Several termination criteria may be used. Since these termination criteria are already applied when generating the paths, path alternatives, which are not able to be implemented or are not unique enough, are excluded early on. Therefore, such excluded path alternatives do not encumber the treelike path generation from the object.

There are also several criteria for determining the geometric uniqueness when generating paths and, thus, the appendices.

By scaling the criteria, the receiver database may be adjusted to the database to be generated, or the receiver database may be completely set up in accordance with the requirements of the receiver (user), e.g., in terms of resolution, object selection, etc.

The scaling may be dynamically carried out in an iterative process.

In systems in which information of the aforementioned type is coded online, in response to a customer query, the test for a clear correlation maximum may be performed not only in the generating database, but also be extended to the receiver (customer) database or be shifted there. This makes it possible, for example, to adjust the road-classification range to be covered, thus to scale it in the sense of a standard scale and thereby optimize it.

The referencing of a path and, thus, of an appendix is carried out to the point where a predefined representative of an object class known to the receiver database is reached. It is thus assured that the referencing of an object is carried out in any case to the point where a link to the traffic network stored by the user is reached.

DETAILED DESCRIPTION

Figure 1:
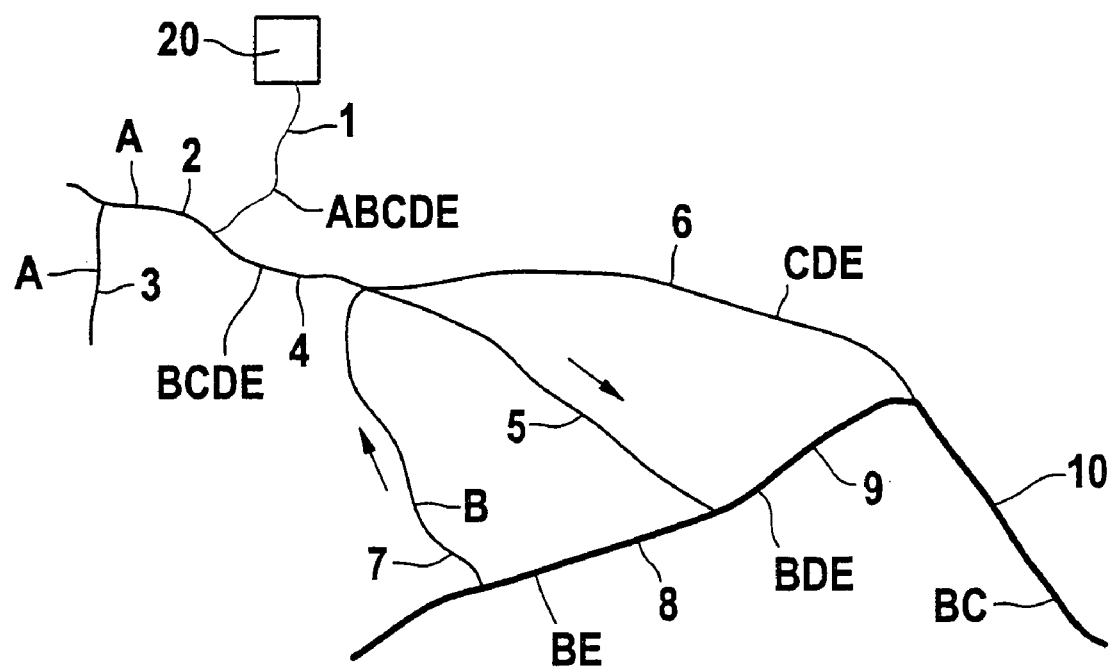
FIG. 1 shows an example of a path selection for a parking garage to be referenced according to the present invention.

As FIG. 1 shows, a tree of possible paths A through E is generated, starting out from an object 20, e.g., a parking garage. In this context, the actual object 20 is supplemented by at least one appendix which describes the geometry of the access road, which may be present in the receiver database and have a geometric form which is unique in the region being considered. The topology shown in FIG. 1 has three different road classes. Partial path 1 (thinnest line drawn), i.e., the direct access to the parking garage, is the road or street having the lowest classification. It is generally not found on any ready-made map and, in any case, appears in the appendix, since there are no alternatives. Partial paths 2, 3, 4, 5, 6, 7 (medium lines drawn) are, in part, alternative roads/streets and belong to the middle classification. The partial paths 8, 9 and 10 are the roads or streets of the road or street network having the highest classification (thick lines drawn). They may appear completely both in the generating database, as well as in the receiver database and are, therefore, selected as preferred partial paths and coded in the appendix. The following may be selected as criteria for evaluating and selecting the paths/partial paths in generating appendices which uniquely reference an object geographically:

whether they lead out from object 20, from a road or street network having a low classification into one having a high classification;

whether they have a unique geometry in the nearby geographic surroundings;

whether from a technical navigational standpoint, they represent a real path (passability, one-way streets, etc.) toward object 20 and/or away from the object;

whether in terms of efficiency, they have a small length to be coded, so that, particularly with respect to the transmission and receiver-side decoding, they may be processed without entailing substantial outlay.

When generating the logical tree of potential paths emanating from object 20, predefined termination criteria are applied, such as the following:

return path to a street having a lower classification than the current one;

directional information indicating the object (one-way street) is withdrawn, since, in any case, an access should be possible.

The paths are sorted and selected in accordance with the aforementioned criteria, and at least one path is coded as an appendix, which best fulfills at least one of the aforementioned criteria, as well as, optionally, at least one additional criteria, which may be one of the aforementioned criteria, i.e., which represents a clear correlation maximum. In this context, as paths, coordinate chains are used which lie at least partially on traffic routes, which are contained in a receiver database 30 and include characteristic properties of parts of a traffic route network.

To determine the geometric uniqueness, the following criteria may be evaluated, both for the entire path, as well as successively during set-up, or for partial paths (by street classification):

whether the sum of the amounts of the (relative) angular changes over the path/partial path exceeds a predefined limiting value;

using the least squares method, whether point sets belong to a same classification or street. For this, a set of form factors may be generated via a non-linear coordinate transformation, for example in accordance with German Published Patent Document No. 198 60 679.

by way of an optionally repeated geometric comparison, whether a found path conforms with a path in a generating database 40, i.e., a clear correlation maximum is ascertained.

By scaling the aforementioned criteria, an adaptation to the data in the receiver database may be undertaken. Through this measure, a selection specially tailored to the requirements of the receiver (user) may be made with respect to resolution, object selection, depth of detail, etc. The scaling may also be dynamically carried out in an iterative process. The customer's requirements are then progressively met as the database grows.

In systems in which geographical referencing information is coded online, i.e., in response to customer queries, the test for a clear correlation maximum may also be expanded and/or shifted to the receiver database. In this way, it is possible to adjust the road-classification range to be covered, thus to scale it in the sense of a standard scale and thereby optimize it.

In the case of the example illustrated in FIG. 1, the parking garage—object 20—may be coded in the following manner:
start with object 20;
set up the tree emanating from object 20 (incompletely) and the resultant paths. Here, the termination criteria are: 1) return to the street having a lower classification than the current one; and 2) navigability to object 20.
This yields the following paths A through E:
A) partial paths 1 2 3
B) partial paths 1 4 7 8 9 10
C) partial paths 1 4 6 10
D) partial paths 1 4 6 9
E) partial paths 1 4 6 9 8.

The formation of paths using partial path 5 was ruled out by termination criteria, since the one-way street (marked by directional arrow) leads away from the object.

Figure 2:
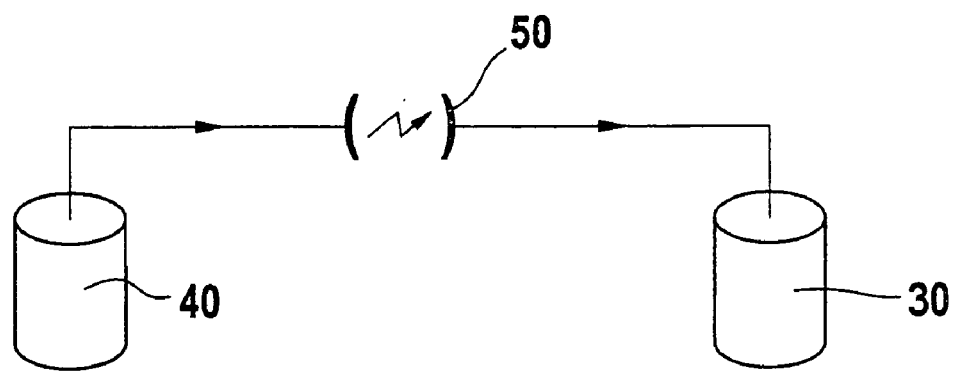
FIG. 2 shows an example transmission of appendices from a generating database to a receiver database according to the present invention.

At this point, an appropriate appendix is selected in the following manner: provided that the most highly classified street classification, shown in FIG. 1 with the thickest lines drawn (partial paths 8, 9, 10), is at least present in receiver database 30 and, thus, in any case should constitute part of the appendix, then path A is dropped. Path C loses against paths B, D and E, since, in terms of the street classification, there is least geometric uniqueness. This also holds for D; after that follows path E. Given the required uniqueness, path B is to be coded as an appendix in the most highly classified street classification. In the individual case, of course, another or further appendices may also be coded, particularly when they best meet various criteria. It is especially practical to code two or more appendices when various map material is to be taken as a basis, for example when a set of appendices is to be used on receiver databases which differ in terms of their depth of detail or in the classification of the points of interest. This means that a user may effectively use appendices 50 transmitted from the generating database 40 to his/her receiver database 30 in a manner that is tailored to his/her requirements (FIG. 2).

To evaluate the paths and for preparation purposes, i.e., coding of the appendices, vector maps in which the details are digitally available are particularly suited. For other map material including printed maps, a previous conversion into vector maps is performed.

An appendix from object 20 may be referenced such that the tree from the path is extended to the point where a predefined representative of an object class known to receiver database 30 is reached in any case. For this, generating database 40 retrieves the depth of detail of the receiver database at least partially. In the previously introduced example this would mean that, starting from object 20 (a parking garage) a probable path and, thus, an appendix, is referenced to the point where a most highly classified street (representative of the object class) is reached which is assumed to be present in the receiver database. The paths may then be weighted, of course, in the previously described manner.

Another example of such a referencing would be when a receiver has all the (main) train stations in his/her receiver database 30 as an object class and requests that a referencing appendix from the object to be referenced end at a (main) train station because this would ensure accessibility to the receiver's traffic network.

What is claimed is:
1. A method for generating appendices which uniquely reference an object geographically, comprising:
generating a tree of a plurality of possible travel paths starting from the object, wherein the possible paths are ascertained from a plurality of map sources;

evaluating the plurality of possible paths in accordance with predefined criteria, the predefined criteria being suited for use as termination criteria at the time the paths are generated; and selecting one of the plurality of possible paths as an appendix of the object, wherein the path selected as the appendix best fulfills at least one of the predefined criteria, and wherein the appendix is selected from the plurality of possible paths based on at least one of the following criteria:
- a) whether a path leads out from the object, from a road or street network having a low classification into one having a higher classification;
- b) whether a path has a unique geometry in nearby geographic surroundings;
- c) whether a path represents a navigable path at least one of toward the object and away from the object; and
- d) whether a path has a small length.

2. The method of claim 1, wherein the path selected as an appendix also best fulfills at least one other criteria.

3. The method of claim 1, wherein coordinate chains are used as the possible paths, and wherein the coordinate chains lie at least partially on traffic routes for the paths, the coordinate chains being contained in a receiver database and include characteristic properties of parts of a traffic route network.

4. The method of claim 1, wherein vector maps are used for selecting the paths, and data pertaining to geographic objects and routes are prepared in advance in the form of vector maps.

5. The method of claim 4, wherein the data includes printed map material.

6. The method of claim 1, wherein the termination criteria include whether a return path to a street has a lower classification, and whether a directional specification does not indicate the object.

7. The method of claim 6, further comprising:
evaluating at least one of the following criteria to determine the geometric uniqueness:
- a) whether a sum of amounts of angular changes over a path exceeds a predefined threshold;
- b) whether point sets, when analyzed using the least squares method, belong to a same classification or street; and
- c) whether a path being considered correlates with a path in a generating database.

8. The method of claim 7, wherein the criteria to determine geometric uniqueness are scaled.

9. The method of claim 8, wherein the criteria to determine geometric uniqueness are scaled in accordance with requirements of a receiver database.

10. The method of claim 8, wherein scaling of the criteria to determine geometric uniqueness is dynamically carried out in an iterative process.

11. The method of claim 9, further comprising:
determining whether the path being considered correlates with a path in the receiver database.

12. The method of claim 1, wherein the appendix is referenced from the object to a point where a predefined representative of an object class known to a receiver database is reached.

13. The method of claim 1, wherein the path selected is the most accessible path.

* * * * *